US008550366B2

(12) United States Patent
Myodo et al.

(10) Patent No.: US 8,550,366 B2
(45) Date of Patent: Oct. 8, 2013

(54) METHOD, APPARATUS AND COMPUTER PROGRAM FOR EMBEDDING BARCODE IN COLOR IMAGE

(75) Inventors: Emi Myodo, Saitama (JP); Shigeyuki Sakazawa, Saitama (JP); Yasuhiro Takishima, Saitama (JP)

(73) Assignee: KDDI Corporation, Tokyo (JP)

( * ) Notice: Subject to any disclaimer, the term of this patent is extended or adjusted under 35 U.S.C. 154(b) by 1447 days.

(21) Appl. No.: 11/829,472

(22) Filed: Jul. 27, 2007

(65) Prior Publication Data

US 2008/0023546 A1 Jan. 31, 2008

(30) Foreign Application Priority Data

Jul. 28, 2006 (JP) .................................. 2006-206214

(51) Int. Cl.
*G06K 19/06* (2006.01)

(52) U.S. Cl.
USPC ...... 235/494; 235/462.04; 235/469; 382/100; 382/183

(58) Field of Classification Search
USPC .................. 235/454, 462.01, 462.03, 462.04, 235/462.09; 382/183
See application file for complete search history.

(56) References Cited

U.S. PATENT DOCUMENTS 5,471,533 A * 11/1995 Wang et al. ...................... 380/51
5,946,414 A * 8/1999 Cass et al. ....................... 382/183
2004/0001133 A1 * 1/2004 Critelli et al. ................. 347/101
2004/0125125 A1 * 7/2004 Levy .............................. 345/716
2004/0125413 A1 * 7/2004 Cordery ........................ 358/3.28
2005/0274804 A1 * 12/2005 Matsumoto ............. 235/462.01

FOREIGN PATENT DOCUMENTS

| JP | 5-135234 A | 6/1993 |
| JP | 2002-329172 A | 11/2002 |
| JP | 2005-316972 A | 11/2005 |
| JP | 2006-031681 A | 2/2006 |

OTHER PUBLICATIONS

"Two-dimensional barcodes design", Gingatsushin Co., Ltd., 2004-2006, http://e-ginga.net/dgrc.shtml, Japan.
"QR code designed by yourself", IT DeSign Inc., 2005-2007, http://it-design.co.jp/, Japan.
"Colorzip", CorlorZip Japan Inc., 2006, http://www.colorzip.co.jp/ja, Japan.

* cited by examiner

*Primary Examiner* — Christopher Stanford
(74) *Attorney, Agent, or Firm* — Westerman, Hattori, Daniels & Adrian, LLP (57) ABSTRACT

A barcode-embedding area is obtained in a color image based on expression possibility by the juxtaposed additive color mixture and possibility of reading of pixels separately by a barcode reader (S11), a color image in the barcode-embedding area is expressed by the juxtaposed additive color mixture, and color images for the code area and the background area, which are readable by the barcode reader, are created (S12, S13), a color-image-superimposed barcode image is created by using the color images for the code area and the background area, and the same color-image-superimposed barcode image is embedded in the barcode-embedding area (S14), and the color-image-superimposed barcode image and the original color image are corrected if necessary (S15, S16).

18 Claims, 4 Drawing Sheets

METHOD, APPARATUS AND COMPUTER PROGRAM FOR EMBEDDING BARCODE IN COLOR IMAGE

BACKGROUND OF THE INVENTION

1. Field of the Invention

The present invention relates to a method, apparatus and computer program for embedding a barcode in a color image, and in particular, a method, apparatus and computer program for embedding a barcode, which, when the viewing distance is long, are capable of inconspicuously embedding a barcode in a color image and hardly spoils the quality of an original image, when the viewing distance is short, capable of visually recognizing the barcode and easily taking an action to read the barcode, and capable of appropriately reading the barcode by using an existing barcode reader installed in a mobile telephone.

2. Description of the Related Art

In a POS system, commodity management is carried out by utilizing a barcode such as a QR code. The barcode consists of a combination of black bar portions and white portions. Herein, the black bar portion is called a code area, and the white portion is called a background area. Also, there are cases where the code area is composed of colors other than black. Since it is difficult to understand the content of the barcodes based only on the barcodes, it is generally carried out that information showing the content of the barcodes is printed in the vicinity of the barcodes. In addition, it has been proposed that information showing the content of the barcodes is printed so as to be superimposed on the barcodes.

Patent Document 1 describes a barcode printing method for printing information transmitted to consumers in addition to the barcodes. With the barcode printing method, the information transmitted to consumers is printed by a first color with the same tone as the illumination light of the barcode reader, and the barcodes are printed by a second color tone with the different tone from the illumination light of the barcode reader.

Patent Document 2 describes a barcode recording method for recording characters, images or identification marks on the barcode. With the barcode recording method, characters, images or identification marks are recorded with a color that does not substantially influence the readability of an optical reader for reading the barcodes.

Further, in recent years, there are many cases where a two-dimensional barcode reader is installed in advance in a mobile telephone as an application. Utilizing such a mobile telephone, it becomes possible to save labor and time for inputting letters such as a URL address by reading two-dimensional barcodes printed on a magazine or a poster.

Patent Document 3 describes that two-dimensional barcodes are colored to form a pattern, a part of a photograph and an illustration is masked, and barcodes whose color is balanced are combined and disposed therein.

Patent Document 4 describes that barcodes are substituted by a single designated color predefined by functions of e-mailing and the Web, and characters, images and symbols corresponding to the functions are displayed on the barcodes.

Non-Patent Document 1 describes QR codes which facilitate conjecture of the content of two-dimensional barcodes by superimposing a logograph and a mark on the two-dimensional barcodes. Non-Patent Document 2 describes OR codes in which the code portion is substituted for an illustrated image in an error-correctable manner, whereby the design value is increased. Non-Patent Document 3 describes two-dimensional codes having a portion expressed as matrices of color blocks, by which color-coded images can be recognized.

Patent Document 1: Japanese Publication of unexamined Patent Application No. 2002-329172
Patent Document 2: Japanese Publication of Unexamined Patent Application No. H5-135234
Patent Document 3: Japanese Publication of Unexamined Patent Application No. 2005-316972
Patent Document 4: Japanese Publication of Unexamined Patent Application No. 2006-31681
Non-Patent Document 1: http://e-ginga.net/dqrc.shtml
Non-Patent Document 2: http://it-design.co.jp/
Non-Patent Document 3: http://www.colorzip.co.jp/ja/

Since it is difficult to understand the content of a barcode consisting only of code areas and background areas based only on the barcodes, the barcodes are hardly controlled. Also, since the barcode itself is a meaningless geometric pattern, there is a problem that the barcode lacks appeal.

In such a type in which information showing the content is printed in the vicinity of the barcode, there is a problem that a space for printing the information is required. For example, where a barcode is printed on a poster, it is generally necessary to take a barcode area in addition to an image area. There is a problem that, even if the barcode is embedded in an image, the barcode becomes conspicuous.

With the barcode printing (recording) methods described in Patent Documents 1 and 2, since information such as characters, images and identification marks other than the barcode is printed (recorded) by colors that does not influence reading by a barcode reader (optical reader), the area of the information other than the barcode must be separate from the code area, and it is necessary to make the colors of both different from each other. In this case, information such as the characters, images and identification marks is expressed in portions other than the code area, and such a case occurs, in which the characters, images and identification marks cannot be sufficiently expressed in a barcode having a large number of code portions as in the QR code.

With two-dimensional barcodes described in Patent Documents 3 and 4 and Non-Patent Documents 1, 2 and 3, design and complications in management of the barcode are improved. However, since the two-dimensional barcodes described in Non-Patent Documents 1 and 2 are not designed so that a color image expressed by the juxtaposed additive color mixture in the two-dimensional barcode portion become almost equal to that of an original color image, the barcode embedded in the color image becomes conspicuous.

For example, in Patent Document 4, by superimposing of a character image, a color barcode having a colored bar portion is created, and the color barcode is disposed outside the image or in the image. Where the color barcode is disposed in the image, the design is taken into consideration by embedding a barcode in a flat-colored image area having a color tone close to the colored bar portion. However, since the juxtaposed additive color mixture in a white area (background area) and bar portion of a barcode is not taken into account, the barcode area is recognized as a color different from the peripheral area when the viewing distance is long. Also, since it is not taken into consideration that the barcode is inconspicuously embedded, a barcode is embedded in a flat area with no priority embedded in the texture area.

Therefore, there is a problem that the design of a color image deteriorates. In addition, the juxtaposed additive color mixture means that colors are mixed so that juxtaposed pixels are visually recognized as the intermediate color thereof. In detail, if color a (Xa,Ya,Za) and color b (Xb,Yb,Zb) exist in a minute area of an image, and the area ratio thereof is m:(1−m), visually recognized color c (Xc,Yc,Zc) becomes Xc=Xa*m+Xb*(1−m), Yc=Ya*m+Yb*(1−m), and Zc=Za*m+Zb*(1−m). Herein, it is assumed that the colors a, b and c are expressed by the CIE-XYZ calorimetric system.

Further, the two-dimensional barcode described in Non-Patent Document 3 is a type of color barcode. There is a problem that it is difficult to embed this barcode in a color image so that it becomes inconspicuous.

SUMMARY OF THE INVENTION

It is therefore an object of the present invention to provide a method, apparatus and computer program for embedding a barcode in a color image, capable of inconspicuously embedding a barcode in a color image when the viewing distance is sufficiently long, capable of recognizing the existence of the barcode linked with a reading action by means of a barcode reader when the viewing distance is sufficiently short, and capable of appropriately reading the barcode using a universal barcode reader.

In order to accomplish the object, the first feature of this invention is that a method for embedding a barcode in a color image, comprises:

a first step of obtaining a barcode-embedding area in a color image based on expression possibility depending on the juxtaposed additive color mixture of colors which can be expressed by a display device, and possibility of reading of pixels separately by a barcode reader when expression is made by the juxtaposed additive color mixture;

a second step of expressing an original color image in the barcode-embedding area by the juxtaposed additive color mixture and creating a color image for the code area and a color image for the background area, which can be separated and read by the barcode reader;

a third step of creating a color-image-superimposed barcode image by substituting the code area by pixels of the color image for the code area and substituting the background area by pixels of the color image for the background area; and a fourth step of embedding the color-image-superimposed barcode image in the barcode-embedding area.

The second feature of this invention is that the first step obtains a barcode-embedding area based on the number of pixels at which expression can be made based on the juxtaposed additive color mixture of the colors which can be expressed by the display device, and at which reading can be separately carried out by the barcode reader when being expressed by the juxtaposed additive color mixture.

The third feature of this invention is that the first step obtains a barcode-embedding area, not based on the number of pixels at which expression can be made based on the juxtaposed additive color mixture of colors which can be expressed by the display device, and at which reading can be separately carried out by the barcode reader when being expressed by the juxtaposed additive color mixture, but based on the number of pixels that can be embedded.

The fourth feature of this invention is that the first step obtains a barcode-embedding area based on the total of pixels that cannot be expressed by the juxtaposed additive color mixture in the domain where reading of pixels can be separately carried out by the barcode reader with respect to colors which can be expressed by the display device.

The fifth feature of this invention is that the first step obtains a barcode-embedding area based on the total sum of distances on how far the pixels that cannot be expressed by the juxtaposed additive color mixture are from the domain that can be expressed by the juxtaposed additive color mixture in the domain where reading of pixels can be separately carried out by the barcode reader with respect to colors which can be expressed by the display device.

The sixth feature of this invention is that where either color of the background area or the code area of a barcode is first determined, the first step obtains a barcode-embedding area based on the total of the number of pixels in the domain that cannot be expressed by the juxtaposed additive color mixture of the colors which can be expressed by the display device and the number of pixels for which reading are separately made impossible by the barcode reader when being expressed by the juxtaposed additive color mixture.

The seventh feature of this invention is that the first step excludes a fixed area portion predefined from the center of a color image from the barcode-embedding area.

The eighth feature of this invention is that the first step determines, as a barcode-embedding area, a domain which can be expressed by the juxtaposed additive color mixture of the colors which can be expressed by the display device, in which cells of the barcode are read by the barcode reader when being expressed by the juxtaposed additive color mixture, and in which the texture of the barcode is similar to that of the original color image.

The ninth feature of this invention is that the first step determines, as a barcode-embedding area, an domain which can be expressed by the juxtaposed additive color mixture the colors which can be expressed by the display device, in which cells of the barcode are separated and read by the barcode reader when being expressed by the juxtaposed additive color mixture, and which is in the vicinity of the boundary line of an area having a large color difference.

The tenth feature of this invention is that where pixels necessary to express an original color image by the juxtaposed additive color mixture of the colors which can be expressed by the display device become those outside the expressible domain, the second step corrects the corresponding pixels so that the pixels are turned into the pixels in the expressible domain.

The eleventh feature of this invention is that where pixels necessary to express an original color image by the juxtaposed additive color mixture of the colors which can be expressed by the display device do not become those that can be separately read by the barcode reader, the second step corrects the corresponding pixels so that the pixels can be separated and read by the barcode reader.

The twelfth feature of this invention is that where pixels necessary to express an original color image by the juxtaposed additive color mixture of the colors which can be expressed by the display device become those that are outside the expressible domain and do not become those that can be separated and read by the barcode reader, the second step corrects the corresponding pixels so that the pixels can be brought about in the expressible domain, and further corrects the corresponding pixels so that the pixels can be separated and read by the barcode reader.

The thirteenth feature of this invention is that, further comprising: a fifth step of substituting and correcting pixels in either of the edge/contour area and an area in which the brightness and/or color have a large difference from those of an original color image or both thereof by pixels of the original color image in an error-correctable manner.

The fourteenth feature of this invention is that, further comprising: a sixth step of correcting pixels of an original color image in a predetermined area at the periphery of the barcode-embedding area.

Further, the present invention is applicable to moving images. In this case, the above-described method for embedding a barcode in the color image is carried out for the first frame of a moving image, and in subsequent frames, a color image for the code area and a color image for the background area are prepared, using the barcode-embedding area obtained in the first frame as the barcode-embedding area, and a color-image-superimposed barcode image is generated by alternately changing an image combined with the code area and the background area to a color image for the code area and a color image for the background area frame by frame, wherein the color-image-superimposed barcode image may be embedded in the above-described barcode-embedding area.

The present invention can be carried out in the form of not only method and apparatus but also computer programs.

According to the present invention, since the color-image-superimposed barcode image embedded in the barcode-embedding area is generated from the color image for the code area and color image for the background area, which express the original color image by the juxtaposed additive color mixture, it is possible to inconspicuously embed the barcode in a part of the color image. If a two-dimensional barcode is embedded, a great deal of information can be inconspicuously embedded in a limited area, or there are many cases where a barcode reader is installed in advance in a mobile telephone, wherein labor and time for individuals to introduce a barcode reader are generally reduced.

According to the present invention, since, in order to inconspicuously embed a barcode in an image, a code area is substituted by a color image for the code area, the background area is substituted by a color image for the background area, and recognized colors and brightness are made almost equal to those of the original color image by the juxtaposed additive color mixture, the area in which the barcode is embedded is observed as being identified with the peripheral original color image, and even if a barcode is embedded in a part of the color image, the atmosphere of the image is not spoiled.

Further, the pixels of the edge area of the color-image-superimposed barcode image and an area having a large difference in brightness and color from the original color image are corrected by substituting the same by pixels of the original color image in an error-correctable manner, and the pixels of the original color image in a predetermined area of the peripheries of the barcode-embedding area. Therefore, the embedded barcode can be made further inconspicuous.

Therefore, for example, in a case of a matrix type barcode, where a color image is observed from the viewing distance at which one cell of the barcode cannot be visually recognized, since the area occupying a majority of the barcode cannot be distinguished from an original image, it is hardly noticeable that the barcode is superimposed in the color image, wherein the quality of the original image is hardly spoiled. In addition, where a characteristic finder pattern exists as a QR code, if the viewing distance is such that one finder pattern cannot be visually recognized, not only the cell but also the finder pattern cannot be visually recognized. Therefore, existence of the QR code is not noticeable. Where embedded in a texture area similar to the barcode, it is hardly noticeable from the viewing distance or less, at which one cell is visually recognizable, that the barcode is superimposed. However, where the viewing distance is sufficiently short, since one cell of the barcode can be recognized, such a feature is brought about, by which a reading action is possible.

Accordingly, where the viewing distance is long, visual separation of the color image and a barcode can be suppressed, and it is possible to display the barcode only in the image area without deteriorating the picture design of a poster and a photograph, etc., by embedding of the barcode. Where the viewing distance is short, since the barcode can be visually recognized, a reading action by a barcode reader can be triggered. For example, where a barcode is embedded in a poster using graphics and a photograph, embedding of a barcode is noticeable when being viewed at a close distance. However, where the poster is viewed at a far distance, a wide area of the poster seems to be subjected to a low-pass filter, existence of the barcode is hardly noticeable.

If the object is a photograph, such a utilization method can be considered wherein the address of the copyright owner of the photograph is embedded using a barcode, and a person requesting the use of the photograph reads the barcode and can make contact to the copyright owner. As a matter of course, a color image in which a barcode is embedded can be displayed not only on a printed matter but also on a display such as a liquid crystal display, a CRT display and a plasma display. With respect to image display software, there are many cases where, if the image size is large, the image is subjected to reduction using a filter based on a bi-cubic method and a bi-linear method, etc., and is displayed. Where the image is reduced, effects similar to those where the viewing distance is long can be brought about, wherein an superimposed barcode becomes hardly visual. The image quality of an original image hardly deteriorates. However, if the color image in which a barcode is embedded is displayed in the original size, a barcode, which can be read by a barcode reader, can be displayed.

In addition, according to the present invention, since a color image for color image code area and a color image for background area are created so as to be separately readable by a barcode reader, it is possible to appropriately read the barcode by using a barcode reader. Therefore, it is possible that an optional color image is superimposed on a barcode and the barcode information is read by a barcode reader under natural light.

Further, if the present invention is applied to moving images, and a barcode to be superimposed is black-white reversed frame by frame, an intermediate color is recognized by virtue of temporal color mixture on respective pixels on moving images. Therefore, the barcode is made further hardly noticeable. A barcode embedded in the moving images can be read by a barcode reader from a photograph shot by a faster shutter speed than the frame-changing speed.

DETAILED DESCRIPTION OF THE PREFERRED EMBODIMENTS

Hereinafter, a description is given of the present invention with reference to the accompanying drawings. Also, the present invention can be carried out in the form of method, apparatus or computer program, and the apparatus is also realized by hardware or software. Hereinafter, a description is given of a case where the present invention is carried out in the form of method. However, the apparatus can be achieved by means of carrying out respective steps, and the computer program can be achieved by causing a computer to execute functions of the respective steps.

Figure 1:
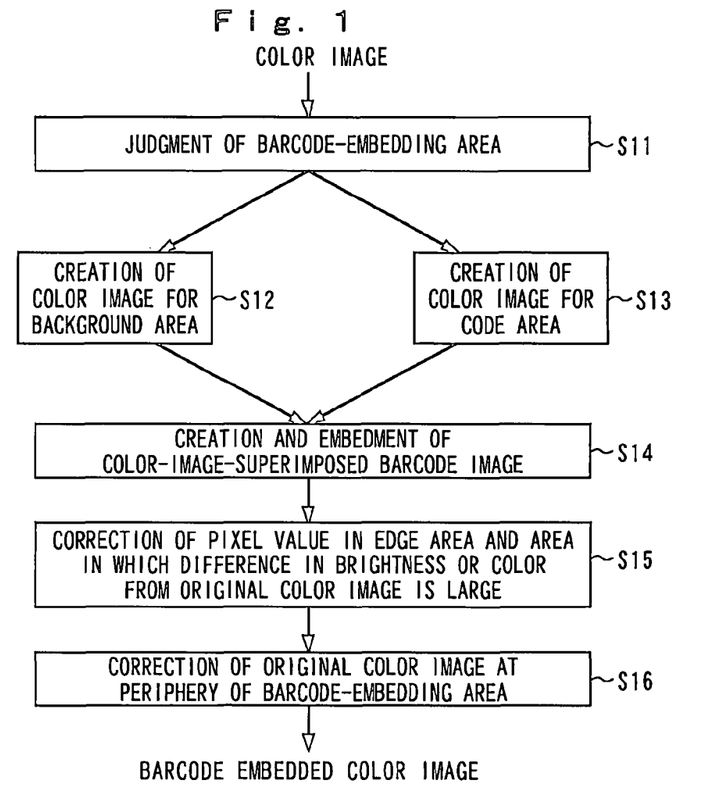
FIG. 1 is a flowchart showing a process in a embodiment of the present invention.

FIG. 1 is a flowchart showing a process in a embodiment of the present invention. First, a barcode image and a color image (original color image) in which the barcode image is embedded are prepared. A area (barcode-embedding area) suitable for embedding the barcode in the color image is judged (S11). The color image may be optional, and the barcode may be a two-dimensional barcode such as a QR code or a one-dimensional barcode. Also, it is assumed that the code area and the background area in the barcode are almost equivalent to each other. When color a (Xa,Ya,Za) and color b (Xb,Yb,Zb) exist in a minute area of an image, there are many cases where the area ratio becomes m:(1−m)=0.5: 0.5. Hereinafter, a description is based on m=0.5. However, the area ratio of the code area to the background area may be calculated for respective minute areas of the barcode. In this case, the colors that can be expressed by the juxtaposed additive color mixture differ in the respective minute areas.

In judgment of S11, using a color domain which can be expressed by a display and/or a printer which become an object for display, or using the color domain of AND aggregation where displaying on a number of displays and printers is made into an object, based on whether expression is enabled by the juxtaposed additive color mixture (that is, expression possibility based on the juxtaposed additive color mixture) and whether pixels are separately readable by a barcode reader when expression is carried out by the juxtaposed additive color mixture (that is, possibility of reading of pixels separately by a barcode reader when expression is made by the juxtaposed additive color mixture), the color and brightness domain by which both are enabled are obtained, and an area where many pixels are accommodated in the domain in an area of the same size as of the barcode in the color image is made into a barcode-embedding area. The color domain which can be expressed by the display and/or printer may be acquired by a spectrophotometer and an ICC profile already issued.

In a detailed example, a barcode-embedding area is judged by the following process (1) and (2).

(1) A domain of pixel values suitable for embedding of a barcode is obtained.

First, a domain of pixel values suitable for embedding of a barcode is obtained on a chromaticity diagram. Where the background area of an area substituted by a barcode is assumed to be, for example, white, a domain of pixel values, which can be expressed by the juxtaposed additive color mixture consisting of white and an optional color, exists. However, even in the domain of pixel values that can be expressed by the juxtaposed additive color mixture, it is not possible to distinguish and read the code area from the background area in a domain of pixel values which cannot be separated from white by a barcode reader. Therefore, the domain of pixel values, which can be expressed by the juxtaposed additive color mixture, but in which the code area and the background area cannot be separately read by a barcode reader, is excluded. The domain of pixel values is made into a domain of pixel values suitable for embedding of a barcode.

Figure 2:
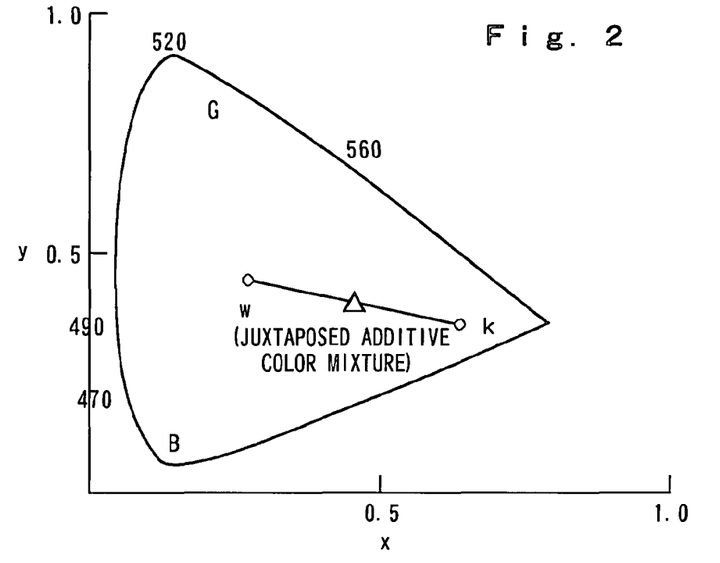
FIG. 2 is a schematic view showing colors obtained by the juxtaposed additive color mixture.

In the xy chromaticity diagram shown in FIG. 2, where the background area is made white, the color obtained by the juxtaposed additive color mixture can be obtained by an intermediate point between the position of white and the position of an optional color. For example, a color at the position Δ is obtained by the juxtaposed additive color mixture of white pixels (w) of the background area and pixels (k) of the code area. Strictly speaking, where the code area and the background area exist almost at the same probability, the juxtaposed additive color mixture may express a middle point between w and k in the ICE-XYZ colorimetric system. Further strictly paying attention to minute areas, if the area ratio of the code area to the background area is m:(1−m), the visually recognized color c (Xc,Yc,Zc) becomes Xc=Xa*m+Xb*(1−m), Yc=Ya*m+Yb*(1−m), and Zc=Za*m+Zb*(1−m), wherein a is a code area and b is a background area.

Figure 3:
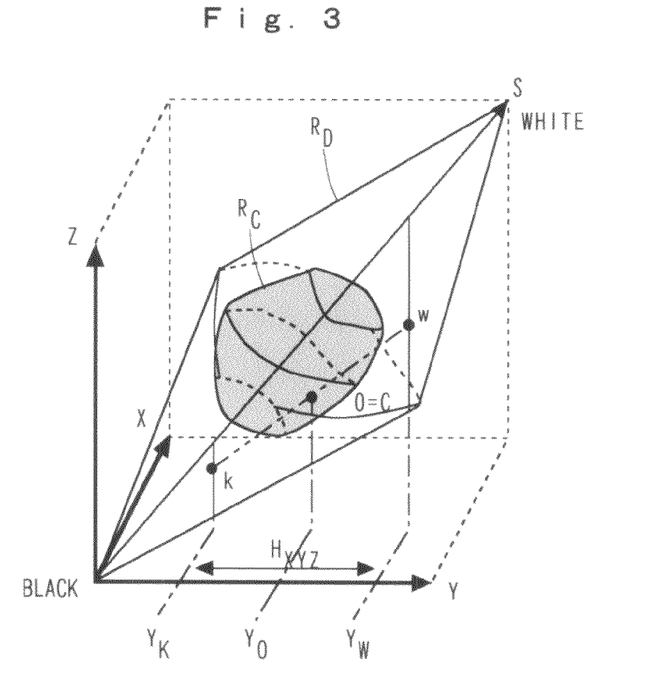
FIG. 3 is a schematic view showing an domain by the CIE-XYZ calorimetric system, which can be expressed by the juxtaposed additive color mixture and readable by a barcode.
Figure 4:
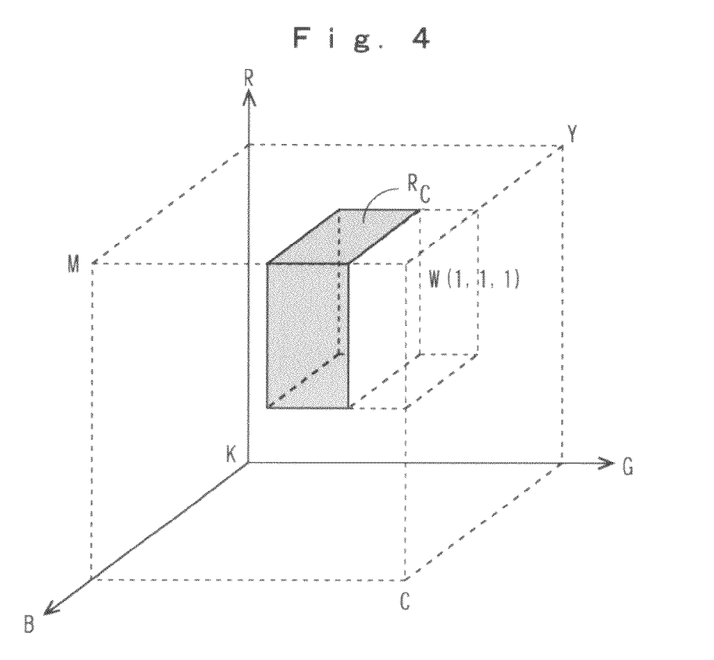
FIG. 4 is a schematic view describing the domain of pixel values suitable for embedding of a barcode.

FIG. 3 and FIG. 4 are schematic views showing a domain of pixel values suitable for embedding of barcodes. In particular, where the background color is not fixed, a domain Rc of FIG. 3 is made into a domain that can be expressed by the juxtaposed additive color mixture. Herein, FIG. 3 employs the CIE-XYZ calorimetric system, wherein $R_D$ is made into a color domain which can be expressed by a display device, and a barcode reader is set so as to be able to read a barcode when a sufficient brightness difference $H_{XYZ}$ exists between the code area and the background area. Also, in FIG. 3, it is assumed that the brightness difference is parallel to the Y axis. Where color k that substituted the code area and color w that substituted the background area exist in a color domain that can be expressed by a display device, and the colors w and k meet the brightness difference $H_{XYZ}$ separable by a barcode reader, the domain taken-up by the middle point between w and k may be made into an area Rc. It can be considered that an area accommodated in the domain Rc, in which there are many pixels of an original image, is suitable for embedding of barcodes.

Where the background color of a barcode is fixed at a single color such as white, a color domain that can be expressed by the juxtaposed additive color mixture of white and colors, which can be expressed by a display device, and can be read by a barcode reader is obtained. If the background color is fixed to white, the domain Rc in FIG. 3 exists in the upper part in a biased state. Therefore, it is possible to obtain a domain of pixel values suitable for embedding of barcodes on the CIE-XYZ colorimetric system. In addition, the color domain that can be expressed by the juxtaposed additive color mixture may not be strictly possible, wherein it is possible to embed barcodes if the color is slightly deviated from the domain obtained.

Herein, in order to facilitate understanding, an RGB chromaticity diagram is added. In FIG. 4, (R,G,B)=(0,0,0) and (R,G,B)=(1,1,1) shows black and white, respectively.

Where the background color is fixed to white, the domain of pixel values that can be expressed by the juxtaposed additive color mixture of white (1,1,1) and an optional color becomes a cube illustrated with the solid lines in the drawing. Also, it is assumed that, where a code area is printed with pixel values whose juxtaposed additive color mixture with white (1,1,1) enters the cube shown with the broken lines in the drawing, the barcode reader is not able to distinguish the code area from white of the background area and to read the same, the domain of pixel values in a cube obtained by excluding the cube shown with the broken lines from the cube shown with the solid lines is made into a domain Rc of pixel values suitable for embedding of barcodes. In addition, the color domain that can be expressed by the juxtaposed additive color mixture may not be strictly possible. If the color is slightly deviated from the domain obtained, it becomes possible to embed the barcode. Further, if the margin of a barcode is made small to such an extent that it can be read by a barcode reader, the boundary between the embedded barcode and the image in which the barcode is embedded can be made inconspicuous.

(2) An area in which a barcode is embedded is obtained.

As the first method of obtaining the area in which a barcode is embedded, there is a method of searching an optimal area, in which the barcode is embedded, based on the number of pixels in the domain of pixel values in (1) described above.

For this realization, while changing the position of the area of a barcode size and taking out the area of the barcode from a color image, it is investigated pixel by pixel whether the pixel in the respective taken-up areas is one in the domain of pixel values in (1) described above. And, the total number of pixels in the domain of pixel values in (1) described above is obtained in regard to the respective taken-up areas, and a taken-up area in which the total number is large to some extent is made into a barcode-embedding area. It may not be investigated whether the respective pixels are in the domain in (1) described above, but the pixel values may be averaged in minute areas and it may be investigated whether the average pixel value is in the domain in (1) described above. Thereby, a minute texture having a brightness difference may be easily entered into the domain in (1) described above. In addition, if a pixel value that is outside the domain of pixel values in (1) described above is slightly deviated from the domain in (1) described above, the pixel may be counted as a pixel in the domain in (1) described above.

Where the calorimetric system of color image differs from the calorimetric system of the domain of pixel values in (1) described above, it is necessary to make the colorimetric systems identical to each other by using a conversion expression. For example, where a color image (photograph) is based on the RGB colorimetric system and the domain of pixel values in (1) described above is based on the XYZ calorimetric system, the color image is converted from RGB to XYZ or the domain of pixel values in (1) described above is converted from XYZ to RGB. After both the colorimetric systems are made identical to each other, the taken-up areas are investigated. Also, since calculations of the juxtaposed additive color mixture are carried out based on the XYZ calorimetric system, it is preferable that the color image is converted from RUB to XYZ.

As the second method of obtaining a barcode-embedding area, there is a method of searching an optimal barcode-embedding area based on the number of pixels outside the domain of pixel values in (1) described above. Herein, if a pixel value that is outside the domain of pixel values in (1) described above is slightly deviated from the domain in (1) described above, the pixel may be counted as a pixel in the domain of pixel values in (1) described above, and the remaining pixels may be considered to be outside the domain of pixel values in (1) described above. Therefore, while changing the position of the area of a barcode size and taking out the area of the barcode from a color image, it is investigated pixel by pixel whether the pixel in the respective taken-up areas is one outside the domain of pixel values in (1) described above.

An area in which the total number of pixels outside the domain of pixel values in the domain in (1) described above is less in the taken-up areas is made into a barcode-embedding area.

Instead of the number of pixels, distances on how the value of pixels that can be embedded are separated from the domain in (1) described above are measured, and a area in which the total sum of the distances is small in the taken-up area may be judged to be suitable for embedding of barcodes.

Also, only where the total number of pixels outside the domain of pixel values in (1) described above is small to some extent, distances on how the values of pixels that can be embedded are separated from the domain in (1) described above are measured, and an area in which the total sum of the distances are small in the taken-up area may be judged to be suitable for embedding of barcodes.

Herein, it is preferable that the distance between the domain in (1) described above and pixel value is calculated by using a uniform color space.

Where the background area is fixed to white, etc., if a pixel is one outside the domain of pixel values that can be expressed by the juxtaposed additive color mixture in (1) described above, the point deducted is 1 (that is, −1 point), and also where the pixel is one outside the domain that is readable by a barcode reader, the point deducted is 1 (that is, −1 point). The total number of points deducted is obtained in regard to the respective taken-up areas, an area where the points deducted are few to some extent may be made into a barcode-embedding area.

Figure 5:
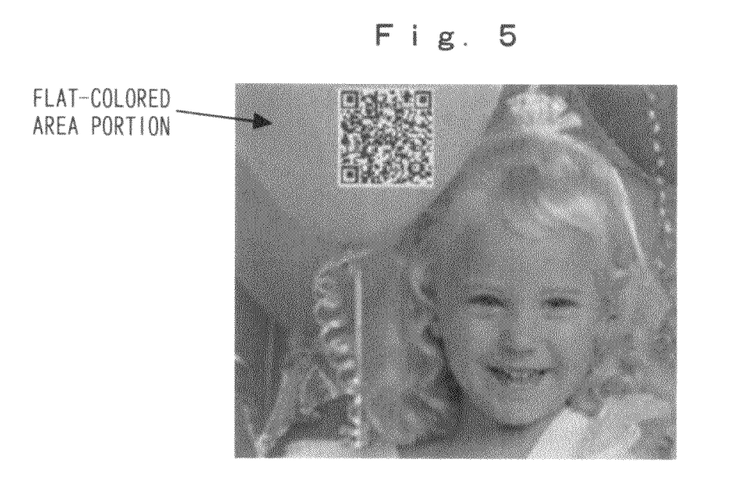
FIG. 5 is a view showing an example in which a barcode is superimposed on a flat-colored area portion of a color image.

Here, it is preferable that an area where a barcode is superimposed is an area that meets the above-described (1) and makes the barcode inconspicuous. If a barcode is superimposed on a flat-colored area portion of a color image, the texture of the barcode becomes conspicuous. FIG. 5 shows an example in which a barcode is superimposed on a flat-colored area portion of a color image. On the other hand, if the texture of a barcode and that of a taken-up area are analyzed, and an area in which mutual textures are similar to each other is made into a barcode-embedding area, the texture of the barcode becomes inconspicuous. This can be achieved by two-dimensional frequency converting the barcode image and the image of the taken-up area, respectively, calculating the correlation of the alternate current components thereof, and regarding those having close correlations as those of close texture. Wavelet transformation, Fourier transformation, DCT transformation, etc., may be used as the two-dimensional frequency conversion.

In addition, since a boundary line is provided when a clear boundary exists on a color image, a texture superimposed in the vicinity of the boundary becomes less conspicuous than the texture superimposed on a flat-colored area portion. At the boundary of two areas (for example, a blue area and a red area) having a large color difference while the take-up area meets the above-described (1), the texture of the barcode is hardly conspicuous. Accordingly, it is preferable that a barcode is embedded in an area close to the boundary line having a large color difference. In order to embed a barcode in an area close to the boundary line having a large color difference, first, a color image is divided into areas having different color differences by using an image area division method such as an area growth/division method, an area division method using a histogram, Snakes active contour model. Next, where an area that meets the above-described (1) includes two different areas, characteristic colors of the respective areas have discrete color differences, and the area boundary is clear, that is, only where the intensity of the area boundary is large, a barcode may be embedded in the corresponding area. However, a thin-lined area surrounded by a specified area is not adopted as the area. It is assumed that the boundary line is continued in the periphery of the barcode embedded. The intensity of the area boundary may be obtained by a differential value in chromaticity in the vicinity of the boundary of areas.

Figure 6:
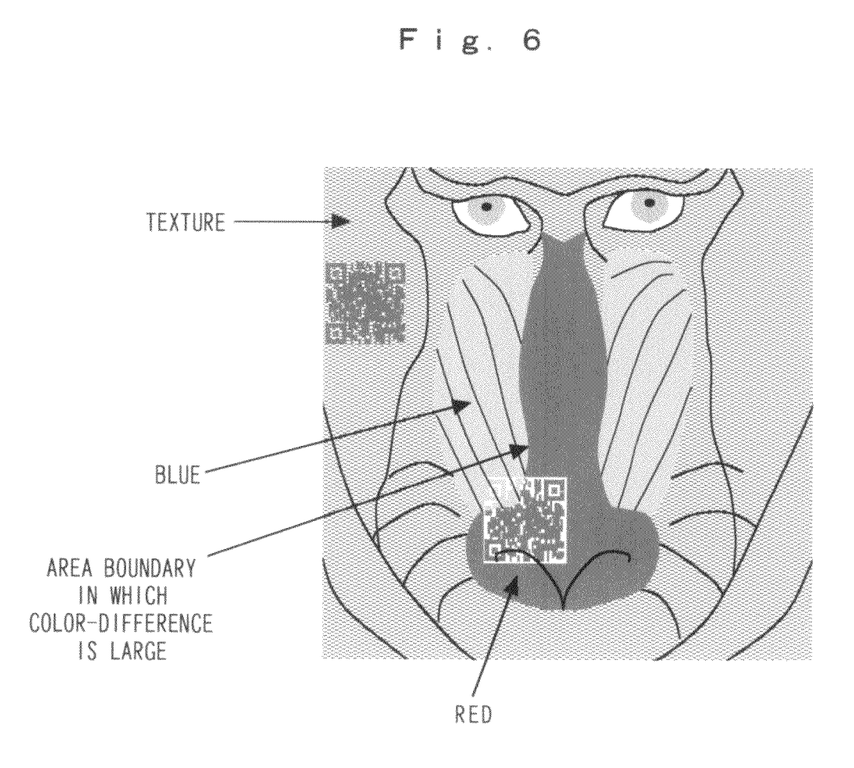
FIG. 6 is a view showing an example in which a barcode is embedded in an area where the texture is similar and the area where the intensity of the area boundary is large.

FIG. 6 shows an example in which a barcode is embedded in areas whose textures are similar to each other and in an area where the intensity of the area boundary is large.

Also, since existence of a barcode is comparatively noticeable at the center portion of a color image and it adversely affects the design of the color image, it is preferable that a predetermined area portion from the center portion of the color image, for example, an area portion existing in one-half range of the length from the center to the periphery is made outside the object of taking up areas from the beginning of processing.

Figure 7:
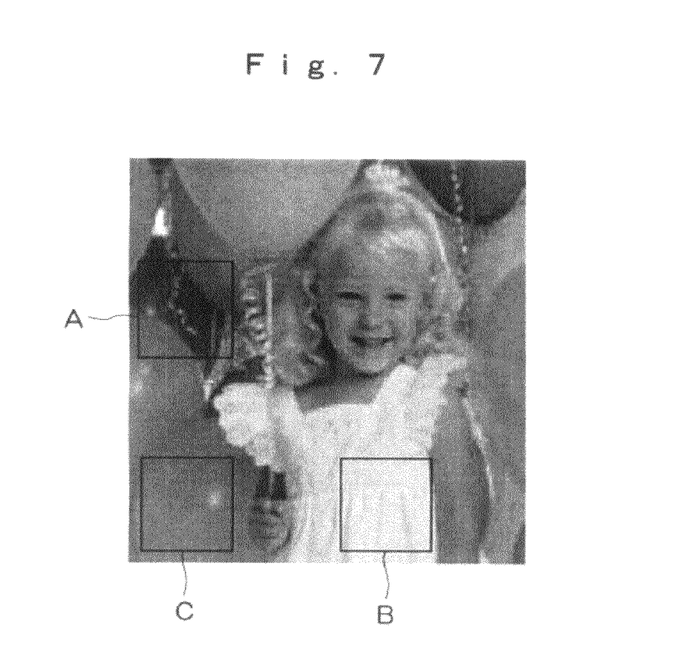
FIG. 7 is a schematic view showing an area suitable for embedding of a barcode.

FIG. 7 is a schematic view showing an area suitable for embedding of barcodes. In FIG. 7, the area A in which a color image is too black, and an area B in which a color image is too white are in a domain that cannot be separated and read by a barcode reader, and cannot be expressed by the juxtaposed additive color mixture. Therefore, these areas A and B are not suitable for embedding of barcodes. An area that is suitable for embedding of barcodes is an area C. Also, the texture portion and a boundary portion of areas having a large color difference are more suitable for embedding of barcodes than the flat-colored portion of a color image.

A plurality of areas is predefined as areas where a barcode is embedded, and an actual barcode-embedding area is selected among them by the above-described process. Furthermore, areas suitable for embedding of barcodes are roughly obtained in compliance with the brightness distribution of a color image, and a barcode-embedding area may be searched for among the areas.

In addition, instead of obtaining, in advance, domain such as the above-described (1), a taken-up area in which there are many embedding pixels may be made into a barcode-embedding area by calculating the number of pixels existing in the taken-up areas, for whether they are in the domain of the above-described (1), in respective taken-up areas. Also, pixels that are not in the domain of the above-described (1) and the distances are obtained, the areas where the number of these pixels and/or the distances are smaller may be made into a barcode-embedding area. In the system for judging whether a barcode can be embedded pixel by pixel, in the case of FIG. 3, if a pixel is made into the middle point between colors w and k, and the colors w and k that are apart from each other by $H_{XYZ}$ or more in regard to the Y axis are in a display domain $R_D$ of a device, embedding is enabled.

Returning to FIG. 1, in S12 and S13, the color and brightness of an original color image in a barcode-embedding area are converted to create a color image for the code area and a color image for the background area. At this time, where the code area for a barcode is substituted by pixels of a color image for the code area, and the background area thereof is substituted by pixels of a color image for the background area, it is possible to read separately the code area and the background area by a barcode reader, and the color and brightness of the color image for code area and the color image for background area based on the juxtaposed additive color mixture are converted to become almost the same as the color and brightness of the original color image.

For example, where the color image for the background area is assumed to be white, the pixel values of color image for the code area pixel by pixel may be determined as described below.

In the XYZ calorimetric system, white of the color image for the background area and colors of an original color image (color image before conversion) desired to be expressed are connected by a straight line, and the position where the length of the straight line is elongated two times is regarded as a pixel value of the color image for the code area. However, pixels that are not in the domain of pixel values in (1) described above exist among the pixels of the taken-up areas. In regard to the pixels in this case, the closest point in the domain of the above-described (1) is regarded as a pixel, and white of the color image for the background area and colors of an original color image (color image before conversion) desired to be expressed are connected by a straight line, and the position where the length of the straight line is elongated two times is regarded as a pixel value of the color image for the code area.

In the above-described embodiments, although the color image for the background area is made white, and the pixel values of the color image for the code area pixel by pixel are converted in S13, the color image for the background area is not limited to white, wherein the color image for the background area may be made into, for example, a color close to the portion in S12 with the color and brightness of the original color image taken into consideration. In this case, it is a matter of course that the pixel values of the color image for the code area are converted in the CIE-XYZ colorimetric system based on the relationship with the pixel values of the color image for the background area. Also, contrarily, first, the pixel values of the color image for the code area are defined, and thereafter, the pixel values of the color image for the background area may be converted in compliance with the corresponding pixel values.

The following can be considered as a method for obtaining both color images for the background area and the code area based on taken-up original images. A hue in which pixels of an original image exist is taken-up from the CIE-XYZ calorimetric system. Although the plane including pixels of the original image and passing through S axis (X=Y=Z) of FIG. 3 has two hue planes symmetrically around the S axis, the side where pixels of the original image exist is made into a hue where the original image exists. Therefore, only the hue of this side is taken into account. Next, a straight line is elongated from the pixels of the original image in a direction along which the brightness is increased, and in a direction along which the brightness is decreased, by $H_{XYZ}/2$ in parallel to the axis of brightness (herein, Y axis). If the point at the distal end of the straight line that is elongated in the direction along which the brightness is increased and the point at the distal end of the straight line that is elongated in the direction along which the brightness is decreased exist in the domain of the above-described (1), the points are made into the pixel value for the background area and the pixel value for the code area, respectively. If neither one is provided in the domain of the above-described (1), the straight line passing through the pixel values of the original image is gradually inclined to cause both points to be entered therein apart by $H_{XYZ}/2$ in the Y-axis direction from the pixel of the original image, wherein the point is made into a pixel value for the background area and a pixel value for the code area. If the contrast of the taken-up original image is not very intensive, the deviation distance may be set to $H_{XYZ}/2$ or more. In addition, in the case of original image pixels that cannot be expressed by the juxtaposed additive color mixture, the pixel is substituted by the pixel closest to the original image pixel and existing in the domain of the above-described (1) and a process similar to the above may be carried out. Further, the distance of pixels may be measured by the Euclid distance in a uniform color space (CIE-L*a*b calorimetric system).

In S14, an image of the barcode area in the original color image is substituted by the color image for background area and color image for code area, which have been converted in terms of color and brightness in S12 and S13. That is, the background area of the barcode is substituted by the color image for the background area, and the code area is substituted by the color image for the code area, thereby generating a barcode image on which a color image is superimposed, and the barcode image is embedded in the barcode-embedding area.

Figure 8:
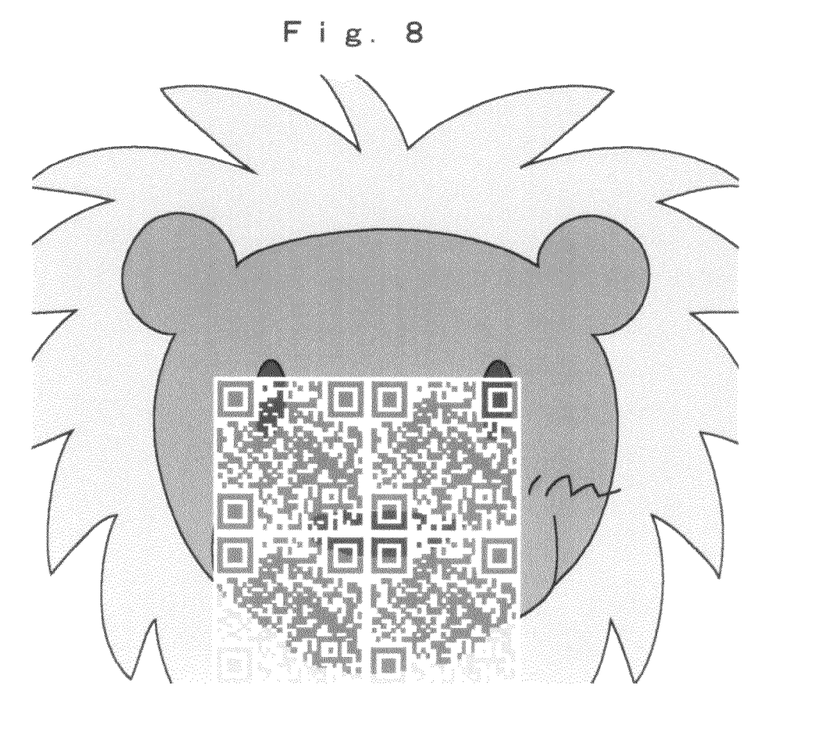
FIG. 8 is a view showing an actual example of an image in which a QR code is embedded.

Based on the above, it is possible to inconspicuously embed the barcode in the color image. FIG. 5, FIG. 6 and FIG. 8 show actual examples of images in which a QR code is embedded. In addition, actually, since the image is a color image, the QR code becomes further inconspicuous than the example illustrated. Also, in FIG. 8, although four QR codes are embedded, the number of QR codes embedded may be one or the other number, and further the QR codes may be embedded in a diagonal direction.

Further, by carrying out the following processes S15 and S16, the barcodes may become further inconspicuous.

In S15, in the color-image-superimposed barcode image, pixels in the edge area and/or an area in which the difference in brightness and color is large in comparison with that and the original color image are corrected. The correction is carried out in an error-correctable manner, and the correction may be carried out regardless of the code area and the background area.

For example, where pixels in the edge area are corrected, the original color image at the barcode-embedding area is subjected to a Sobel filter or a Laplacian filter, thereby specifying an area having a large edge, or a contour extracting filter, thereby specifying a contour portion, wherein the corresponding area is substituted by the pixel values of the original color image. That is, in an area in which the edge of a color image in the barcode-embedding area is large, the original color image is overwritten on the embedded barcode. In FIG. 6, the nose of mandrill is overwritten. In a case of a human face, areas having features such as eyes, nose, mouth (mouth corners), etc., may be over written.

Also, in a case of correcting pixel values in an area in which the difference in brightness and/or color from the original color image is large, mainly the corrected pixels which are not in the domain of the above-described (1) are substituted by pixel values of the original image. By correcting these pixel values, it is possible to make the embedded barcodes further inconspicuous. Further, since correction is attempted in the error-correctable manner, it is possible to read the barcode without any error when reading the same.

In S16, by correcting the original color image of the other portion in accordance with the color-image-superimposed barcode image, the embedded barcode can be made still further inconspicuous. That is, where the difference between the brightness and color of the color-image-superimposed barcode image and those of the original color image at the periphery thereof is large, there may be cases where the boundary is conspicuous. Therefore, the original color image is corrected in terms of its brightness and color in accordance with the color image at the barcode-embedding area.

It is preferable that this correction is carried out in regard to the color images at the periphery of the barcode-embedding area. Although, by embedding the barcode, there may be cases where the saturation of the juxtaposed additive color mixture after the barcode is embedded is lowered in comparison with that before being embedded, it is possible to prevent the saturation from being lowered in comparison with the case where the entire color image is corrected, by correcting mainly the color image at the periphery of the barcode-embedding area. Such correction may be carried out so that the processes S11 through S15 are carried out to embed a barcode after lowering the saturation of the original color image or condensing the brightness to halftone, thereafter the area far from the barcode-embedding area are returned to the original color image, and the periphery of the barcode-embedding area is corrected so that embedding of the barcode is made inconspicuous. Since a lowering in saturation and a change in brightness are apt to occur in the barcode-embedding area, the peripheral images are corrected so that these are made inconspicuous.

Also, the barcode-embedding area may be determined in case that a range Rc is not acquired. First, the barcode is subjected to Gaussian filtration, etc. per pixel or average of some pixels, thereby estimating the density.

For example, it is assumed that the background: code=m: 1−m is estimated.

Next, an appropriate area of the original image is cut out by the size of the barcode. It is determined whether the pixel value of the cut-out original color images can be read by the juxtaposed additive color mixture and the barcode. At this time, the point at which the background color a of a substitution candidate and a code color b thereof are shared by 1−m:m is made into the pixel value of the original image.

With respect to the pixel value of the original image, the pixel value in which X, Y and Z are, respectively, subjected to Gaussian filtration may be used.

At this time, an area where the number of the pixel value which can be substituted exceeds a predetermined value, or where when various areas are taken out from the original image, the number of substitutable pixels is the most is made into a barcode-embedding area.

If the number of the pixel value which can be substituted exceeds a predetermined value, an area in which the texture of the original image is similar to the texture of the barcode and there is a large color difference is made into a barcode-embedding area with the priority placed.

In the above description, a description is given of a case where a barcode is embedded in a still image. However, it is possible to embed a barcode in a part of a moving image. Where a barcode is embedded in a moving image, first, a barcode-embedding area is obtained, as in the above description, in an image of a certain frame (the first frame), the color and brightness of the original color image at the barcode-embedding area are converted to create a color image for the code area and a color image for the background area. Next, the code area is substituted by a color image for the code area, and the background area is substituted by a color image for the background area.

In subsequent frames, color images for the code area and color images for the background area are created by using the barcode-embedding area obtained in the first frame as a barcode-embedding area. And, in the second frame continued from the first frame, the code area is substituted by the color image for the background area, and the background area is substituted by the color image for the barcode area. In the third frame continued from the second frame, the code area is substituted by the color image for the code area, and the background area is substituted by the color image for the background area. In the fourth frame continued from the third frame, the code area of the barcode is substituted by the color image for the background area, and the background area is substituted by the color image for the barcode area. In such a manner, images combined in the code area and the background area are alternately changed to the color image for the code area and the color image for the background area frame by frame, wherein color-image-superimposed barcode images thus created are embedded.

In this case, since juxtaposed additive color mixture occurs temporally pixel by pixel in a moving image in human eyes, it is possible to make the barcode further unnoticeable. The barcodes embedded in a moving image can be read by a barcode reader from a photograph shot at a faster shutter speed than the frame-changing speed.

In the above, although the embodiments were described, the present invention is not limited thereto. For example, a barcode may be embedded in a graphic image, and a barcode may be diagonally embedded and can be read in a diagonal direction. In addition, if application software is incorporated in a mobile telephone, which can embed a barcode in a photograph picked by the mobile telephone, QR code information transmission having a high entertainment feature is enabled.

S11 . . . Judgment of barcode-embedding area, S12 . . . Creation of color image for background area, S13 . . . Creation of color image for code area, S14 . . . Creation and embedment of color-image-superimposed barcode image, S15 . . . Creation of pixel value in edge area and areas in which difference in brightness or color from original color image is large, S16 . . . Creation of original color image

What is claimed is:

1. A method for embedding a barcode in a color image, comprising:
   a first step of determining a barcode-embedding area for embedding a barcode in an original color image, wherein the barcode-embedding area is in a color and brightness domain, which is defined on a chromaticity diagram based on a juxtaposed additive color mixture of colors and is defined based on the total of pixels that cannot be expressed by the juxtaposed additive color mixture in the domain where reading of pixels can be separately carried out by the barcode reader with respect to colors expressible by the display device, which are expressive by a display device and are separately readable by a barcode reader, wherein the barcode-embedding area in an area in which the texture of the original color image is similar to that of the barcode or the barcode-embedding area includes a boundary line between two different color regions;
   a second step of creating a color image for the code area and a color image for the background area expressing pixel-values of the original color image in the barcode-embedding area using the juxtaposed additive color mixture of colors separately readable by the barcode reader;
   a third step of creating a color-image-superimposed barcode image by substituting the background area by pixels of the color image for the background area; and
   a fourth step of embedding the color-image-superimposed barcode image in the barcode-embedding area.

2. The method according to claim 1, wherein the first step excludes a fixed area portion predefined from the center of the original color image from the barcode-embedding area.

3. The method according to claim 1, wherein, where pixels necessary to express the original color image by the juxtaposed additive color mixture of the colors expressible by the display device become those outside an expressible domain, the second step corrects the corresponding pixels so that the pixels are turned into the pixels in the expressible domain.

4. The method according to claim 1, further comprising: a further step of substituting and correcting pixels in either of an edge/contour area and an area in which a brightness and/or color have a large difference from those of the original color image or both thereof by pixels of the original color image in an error-correctable manner.

5. The method according to claim 1, further comprising: a sixth step of correcting pixels of the original color image in a predetermined area at the periphery of the barcode-embedding area.

6. A method for embedding a barcode in a color image, comprising:
   carrying out the method according to claim 1 with respect to a first frame of a moving image;
   in subsequent frames, creating a color image for the code area and a color image for the background area using the barcode-embedding area obtained in the first frame as a barcode-embedding area;
   creating a color-image-superimposed barcode image by alternately changing images combined in the code area and the background area to the color image for the code area and the color image for the background area frame by frame; and
   embedding the corresponding color-image-superimposed barcode image in the barcode-embedding area.

7. A method for embedding a barcode in a color image, comprising:
   a first step of determining a barcode-embedding area for embedding a barcode in an original color image, wherein the barcode-embedding area is in a color and brightness domain, which is defined on a chromaticity diagram based on a juxtaposed additive color mixture of colors and is defined based on the total sum of distances on how far the pixels that cannot be expressed by the juxtaposed additive color mixture are from a domain that can be expressed by the juxtaposed additive color mixture in a domain where reading of pixels can be separately carried out by the barcode reader with respect to colors expressible by the display device, which are expressive by a display device and are separately readable by a barcode reader, wherein the barcode-embedding area in an area in which the texture of the original color image is similar to that of the barcode or the barcode-embedding area includes a boundary line between two different color regions;
   a second step of creating a color image for the code area and a color image for the background area expressing pixel-values of the original color image in the barcode-embedding area using the juxtaposed additive color mixture of colors separately readable by the barcode reader;
   a third step of creating a color-image-superimposed barcode image by substituting the code area by pixels of the color image for the code area and substituting the background area by pixels of the color image for the background area; and
   a fourth step of embedding the color-image-superimposed barcode image in the barcode-embedding area.

8. The method according to claim 7, wherein the first step excludes s fixed area portion predefined from the center of the original color image from the barcode-embedding area.

9. The method according to claim 7, where pixels necessary to express the original color image by the juxtaposed additive color mixture of the colors expressible by the display device become those outside an expressible domain, the second step corrects the corresponding pixels so that the pixels are turned into the pixels in the expressible domain.

10. The method according to claim 7, further comprising:
    a further step of substituting and correcting pixels in either of an edge/contour area and an area in which a brightness and/or color have a large difference from those of the original color image or both thereof by pixels of the original color image in an error-correctable manner.

11. The method according to claim 7, further comprising:
    a sixth step of correcting pixels of the original color image in a predetermined area at the periphery of the barcode-embedding area.

12. A method for embedding a barcode in a color image, comprising:

carrying out the method according to claim 7 with respect to a first frame of a moving image;

in subsequent frames, creating a color image for the code area and a color image for the background area using the barcode-embedding are obtained in the first frame as a barcode-embedding area;

creating a color-image-superimposed barcode image by alternately changing images combined in the code area and the background area to the color image for the code area and the color image for the background area frame by frame; and embedding the corresponding color-image-superimposed barcode image in the barcode-embedding area.

13. A method for embedding a barcode in a color image, comprising:

a first step of determining a barcode-embedding area for embedding a barcode in an original color image, wherein the barcode-embedding area is in a color and brightness domain, which is defined on a chromaticity diagram based on a juxtaposed additive color mixture of colors and, where either color of the background area or the code area of the barcode is first fixed, is defined based on the total of the number of pixels that cannot be expressed by the juxtaposed additive color mixture of the colors expressible by the display device and the number of pixels that cannot be separately read by the barcode reader when expression is made by the juxtaposed additive color mixture, which are expressive by a display device and are separately readable by a barcode reader, wherein the barcode-embedding area in an area in which the texture of the original color image is similar to that of the barcode or the barcode-embedding area includes a boundary line between two different color regions;

a second step of creating a color image for the code area and a color image for the background area expressing pixel-values of the original color image in the barcode-embedding area using the juxtaposed additive color mixture of colors separately readable by the barcode reader;

a third step of creating a color-image-superimposed barcode image by substituting the code area by pixels of the color image for the code area and substituting the background area by pixels of the color image for the background area; and a fourth step of embedding the color-image-superimposed barcode image in the barcode-embedding area.

14. The method according to claim 13, wherein the first step excludes s fixed area portion predefined from the center of the original color image from the barcode-embedding area.

15. The method according to claim 13, where pixels necessary to express the original color image by the juxtaposed additive color mixture of the colors expressible by the display device become those outside an expressible domain, the second step corrects the corresponding pixels so that the pixels are turned into the pixels in the expressible domain.

16. The method according to claim 13, further comprising:

a further step of substituting and correcting pixels in either of an edge/contour area and an area in which a brightness and/or color have a large difference from those of the original color image or both thereof by pixels of the original color image in an error-correctable manner.

17. The method according to claim 13, further comprising:

a sixth step of correcting pixels of the original color image in a predetermined area at the periphery of the barcode-embedding area.

18. A method for embedding a barcode in a color image, comprising:

carrying out the method according to claim 13 with respect to a first frame of a moving image;

in subsequent frames, creating a color image for the code area and a color image for the background area using the barcode-embedding are obtained in the first frame as a barcode-embedding area;

creating a color-image-superimposed barcode image by alternately changing images combined in the code area and the background area to the color image for the code area and the color image for the background area frame by frame; and embedding the corresponding color-image-superimposed barcode image in the barcode-embedding area.

* * * * *